(12) United States Patent
Baker et al.

(10) Patent No.: US 10,671,733 B2
(45) Date of Patent: Jun. 2, 2020

(54) POLICY ENFORCEMENT VIA PEER DEVICES USING A BLOCKCHAIN

(71) Applicant: International Business Machines Corporation, Armonk, NY (US)

(72) Inventors: Ronald B. Baker, Wake Forest, NC (US); Ravid Sagy, Beit Yizhack (IL)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 15/600,169

(22) Filed: May 19, 2017

(65) Prior Publication Data

US 2018/0337771 A1 Nov. 22, 2018

(51) Int. Cl.
| | | |
|---|---|---|
| G06F 21/00 | (2013.01) | |
| G06F 21/57 | (2013.01) | |
| H04L 29/06 | (2006.01) | |
| G06F 21/40 | (2013.01) | |
| H04L 9/32 | (2006.01) | |

(52) U.S. Cl.
CPC ............ G06F 21/575 (2013.01); G06F 21/40 (2013.01); H04L 9/3236 (2013.01); H04L 63/061 (2013.01); H04L 63/101 (2013.01); H04L 63/306 (2013.01); H04L 63/0861 (2013.01); H04L 2209/38 (2013.01)

(58) Field of Classification Search
CPC ..... G06F 21/575; G06F 21/40; H04L 9/3236; H04L 63/102; H04L 63/0861; H04L 2209/38
USPC .......................................................... 713/150
See application file for complete search history.

(56) References Cited

U.S. PATENT DOCUMENTS

| | | | |
|---|---|---|---|
| 6,438,690 B1 | 8/2002 | Patel et al. | |
| 8,234,498 B2 | 7/2012 | Britti et al. | |
| 8,971,932 B2 | 3/2015 | Mapes | |
| 9,301,140 B1 | 3/2016 | Costigan et al. | |
| 9,461,983 B2 | 10/2016 | Banerjee et al. | |
| 2012/0290833 A1* | 11/2012 | Clegg ................... | H04L 9/3226 713/156 |
| 2013/0159704 A1* | 6/2013 | Chandrasekaran ..... | G06F 21/57 713/156 |
| 2016/0294548 A1* | 10/2016 | Qian ..................... | H04L 63/062 |
| 2018/0089436 A1* | 3/2018 | Smith ................... | G06F 21/575 |
| 2018/0097638 A1* | 4/2018 | Haldenby ................ | H04L 9/14 |

(Continued)

OTHER PUBLICATIONS

Thompson, B. (2016). Apple Versus the FBI, Understanding iPhone Encryption, The Risks for Apple and Encryption. Retrieved from: https://stratechery.com/2016/apple-versus-the-fbi-understanding-iphone-encryption-the-risks-for-apple-and-encryption/.

(Continued)

*Primary Examiner* — Kendall Dolly
*Assistant Examiner* — Kevin Ayala

(57) ABSTRACT

A blockchain of transactions may be referenced for various purposes and may be later accessed by interested parties for ledger verification or information retrieval. One example method of operation may include one or more of receiving an access request from a requesting device for access to an encryption key associated with a user device, broadcasting the request to peer nodes for approval or disapproval, storing a transaction to a blockchain indicating the approval or disapproval of the request for access to the encryption key, and providing access to the encryption key when the approval is indicated.

20 Claims, 6 Drawing Sheets

(56) References Cited

U.S. PATENT DOCUMENTS

2018/0167198 A1* 6/2018 Muller .................... G06F 21/16
2018/0254891 A1* 9/2018 Linder .................... H04L 9/085
2018/0267539 A1* 9/2018 Shih ........................ G06N 7/00

OTHER PUBLICATIONS

Green, M. (2014). Why can't Apple decrypt your iPhone? Retrieved from: https://blog.cryptographyengineering.com/2014/10/04/why-cant-apple-decrypt-your-iphone/.

* cited by examiner

350

POLICY ENFORCEMENT VIA PEER DEVICES USING A BLOCKCHAIN

TECHNICAL FIELD

This application generally relates to policy enforcement, and more particularly, to policy enforcement via peer devices using a blockchain.

BACKGROUND

A blockchain may be used as a public ledger to store any type of information. Although, primarily used for financial transactions, a blockchain can store any type of information including assets (i.e., products, packages, services, status, private information, etc.). A blockchain may be used to securely store any type of information in its immutable ledger.

There is a conflict between the concerns of enforcement agencies and technology vendors attempting to protect users from privacy violations and identity theft. At the center of this conflict is encryption technology that has become sufficiently difficult to break on many devices. Encryption is generally provided by a centrally managed device administering keys and controlling the encryption of other devices. Such a configuration is vulnerable to attacks from hackers and unauthorized third parties.

An alternative to centralized encryption key management is to permit devices to store and manage their own encryption keys. This approach has its own drawbacks when access to the device is necessary by an authorized third party, such as law enforcement or other governing entities. For example, determining who and when access should be shared to users' personal computing devices presents its own challenges, such as who to trust and what credentials are necessary to offer such access.

SUMMARY

One example embodiment may include a method that comprises one or more of receiving an access request from a requesting device for access to an encryption key associated with a user device, broadcasting the request to peer nodes for approval or disapproval, storing a transaction to a blockchain indicating the approval or disapproval of the request for access to the encryption key, and providing access to the encryption key when the approval is indicated.

Another example embodiment may include an apparatus that includes one or more of a receiver configured to receive an access request from a requesting device for access to an encryption key associated with a user device, a processor configured to broadcast the request to peer nodes for approval or disapproval, store a transaction to a blockchain indicating the approval or disapproval of the request for access to the encryption key, and a transmitter configured to provide access to the encryption key when the approval is indicated.

Still another example embodiment may include a non-transitory computer readable storage medium configured to store instructions that when executed cause a processor to perform one or more of receiving an access request from a requesting device for access to an encryption key associated with a user device, broadcasting the request to peer nodes for approval or disapproval, storing a transaction to a blockchain indicating the approval or disapproval of the request for access to the encryption key, and providing access to the encryption key when the approval is indicated.

DETAILED DESCRIPTION

Figure 1A:
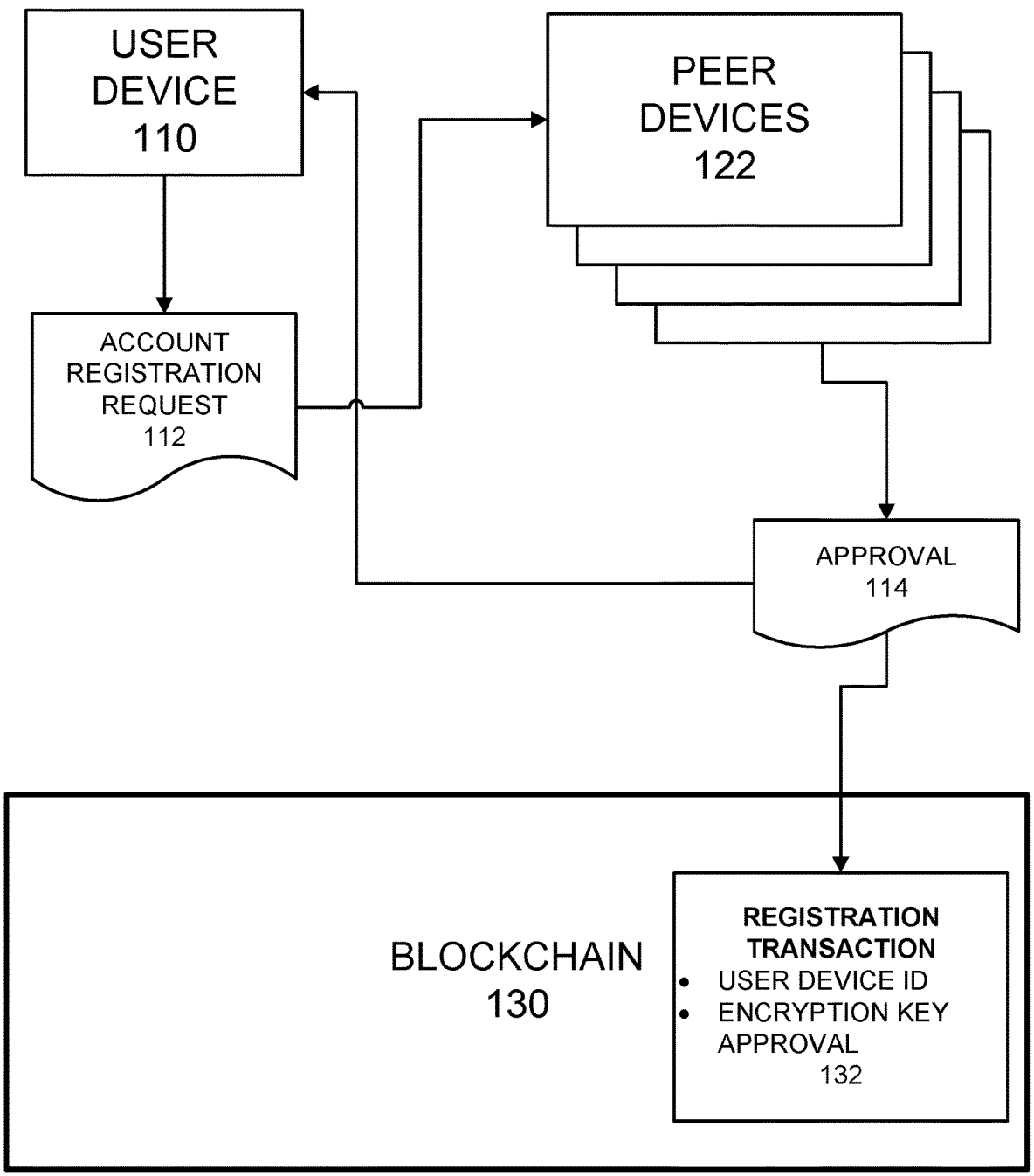
FIG. 1A illustrates a user device registering with a consensus authority and storing registration in a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to using a blockchain to provide support for peer device policy enforcement, and in another embodiment relates to enabling peer devices to reach a consensus regarding access to encryption keys of users based on the appropriate credentials.

Example embodiments provide for device encryption key access to only those entities which are highly privileged to have access to a users' privacy. In general, no device should have its security compromised, however, governments, other authorities and other entities may require access to individual user profiles, accounts, phones, etc. Data that is encrypted must be decrypted based on an established key. In one example, the encryption key may only reside on the user device itself protected by a combination of hardware and firmware. This provides that the key is not stored at the vendor, centralized server and/or enforcement agency, which reduces the possibility of a third party hacking a central key store location and compromising users' data. In this configuration, the enforcement agency may only have access to the encryption keys it has specifically been authorized for by a judicial authority, avoiding violation of a user's civil rights. In this example, the enforcement agency has an opportunity to deny encryption for users, which provides for a set of trusted organizations to participate in a peer review process, and thus provide transparency and consensus approvals. For example, if the device detects an approved ledger record, the operating system can forward the "encryption key" to an approved receiver. This approach is based on the assumption that the user device operating system has access to a file system key specifically and not the user passcode or user identifier. If during bootup, the device accesses a blockchain and identifies a transaction that has the proper authority to access the device's encryption key, the device (e.g., smartphone, cell phone, laptop, smartwatch, smart-eyewear, etc.) may then forward the encryption key via an API to the vendor responsible for providing security and service to the device.

According to example embodiments, the operating system processes decryption of the files using the returned file system key or passes the file data through special hardware and only observes the final decrypted results. In the example of the operating system, only the file system key needs to be returned and decryption can be accomplished from the device storage. In the example of the hardware unit, then the decrypted data can be returned however there would be a large amount of data.

FIG. 1A illustrates a consensus peer node approach to granting encryption key access rights according to example embodiments. Referring to FIG. 1A, the example configuration 100 includes a user device 110, such as a mobile device or other computing device requesting an initial registration procedure by requesting an encryption key authorization from a set of blockchain peer devices 122 . . . N. The peer devices 122 may authorize the key if the user device is authorized to encrypt data and is not blacklisted or otherwise not authorized. The request, approval/denial, etc., may all be logged in the blockchain 130 as part of a transaction which may include a user identifier, user biometrics, location information, or any other information linking a user profile to the user device. In this example, the encryption key approval procedure is noted and added to the blockchain 130 as transaction 132. In this example, the encryption key is already on the device and may be used by the device responsive to receiving registration confirmation message or some other indication after the registration was completed.

The process may begin with the user device 110 transmitting a registration request for account registration 112. The message may be broadcast to various peers. Those entities may be part of the peer device network designated to approve or disapprove the request for registration. The approval 114 creates the transaction 132 in the blockchain 130 for secure storage and reference purposes.

The participants in this approach may include a client or consumer, typically using a technology device for communication. This may be generalized as any Internet of Things device. Other participants include the vendor providing the technology, which may be either the hardware, software, or combination of both, the enforcement agency, which may be law enforcement or other type of policy enforcement entity or government. In operation, the entity will typically make the request for access to the encryption key, based on appropriate evidence of law or policy violation by the user. The judicial authority, may approve the request based on presentation of the necessary evidence and grant access rights (i.e., warrant, rights, etc.). A set of validating peers are established in this blockchain configuration, which may include recognized organizations that decide together, through a consensus mechanism, to add transactions to the blockchain. Other candidate peers may be individual corporations, standards groups, or other consortium organizations recognized as leaders in this space.

FIG. 1A illustrates the initial registration procedure. The initial provisioning of the device 110 itself, whether the first consumer, a consumer that has repurchased a used device, or any device reset that takes it back to the original factory settings. At the end of this procedure, the device has been approved for use and data encryption and the consumer begins using the device for communications. The vendor may have a list of its consumers, including the approvals by the enforcement agency and judicial authority, giving it freedom to service the consumer and protect their data. At this point, the enforcement agency may choose to include an automated security check against their historical enforcement data and deny the request immediately. Alternatively, they may approve the request but record information they are legally entitled to for future awareness, including the fingerprint scan, credit card number, or phone number for matching the device identifier to a physical person, all of which may be part of the transaction 132 or another transaction related to the user device. Once the device has received approval, it may generate its encryption keys as normal and encrypt the device data.

Figure 1B:
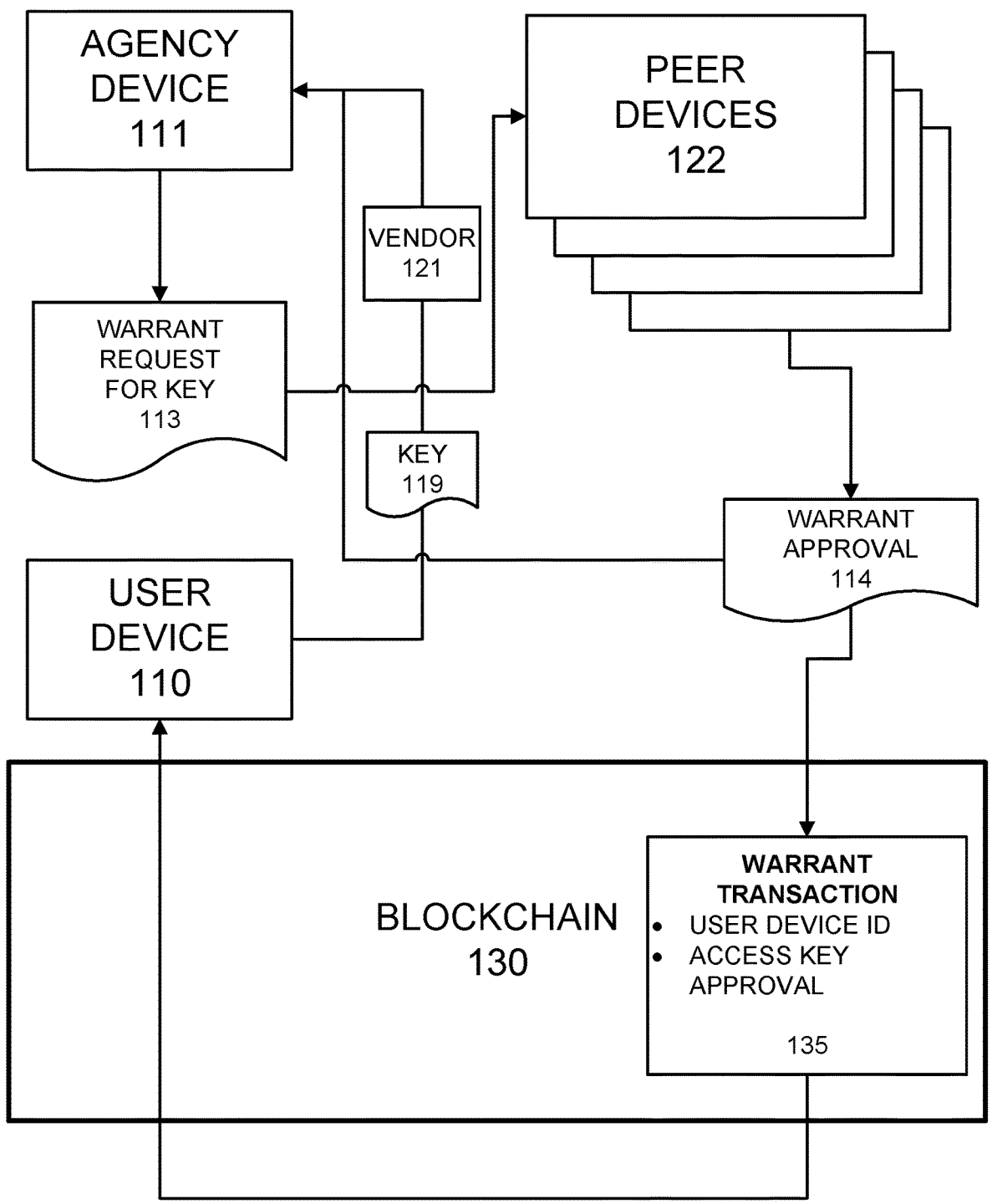
FIG. 1B illustrates an authority device requesting access with the consensus authority to access the encryption key of the user device according to example embodiments.

FIG. 1B illustrates another configuration 150 where the agency 111 acts as a requesting entity to obtain access to the mobile device 110. When a situation arises when the enforcement agency needs data on the device to investigate law or policy violations, it can request access to the encryption key for searching the device. This also provides that they may need a physical warrant to obtain the actual device as well, but this request can be made separately, in the event that they can use the encryption key to search data stored at the vendor (such as various central databases). In FIG. 1B, the request for the encryption key 113 may be sent to the peer review 122 for consensus. If approved, the warrant and approval information 114 may be sent to the blockchain 130 for an updated transaction 135. When the transaction is logged, the user device may identify the status change upon bootup and then share the key 119 with a trusted entity, such as the vendor 121 who may have a procedure for distributing the key to the registered agency authority 111. The transaction is broadcast to the legal authority, which reviews the merit of the request, and grants or denies the warrant. If the warrant request is granted or denied, then an additional encrypted transaction is broadcast to the replicas. The vendor, typically acting as the primary replica, will process the consensus and add the transaction to the chain, which makes the enforcement agency and vendor aware of its status. Given the infrequency of this request, the device would check the blockchain ledger during its normal boot sequence, presumably when establishing cellular or WIFI connectivity or on some periodic basis to minimize customer impact.

The bootup process could be expedited by the enforcement agency obtaining a warrant for the device itself, and forcing the boot sequence manually, or the vendor sending a remote boot request as a result of obtaining the approval. In either case, once the device has determined there is an approved access request, it forwards its encryption key to the vendor. If the encrypted data has been backed up to the vendor's central database, it may be made immediately available to the enforcement agency. This requires the device operating system to check the blockchain ledger during boot sequence, which accommodates the policy enforcement agency while providing privacy protection and avoiding litigation against the technology vendors. This approach does not require a special version of the operating system for law enforcement or a "back-door" key that could jeopardize security of all devices. Warrant requests will have an expiration period, enforced by the blockchain, to ensure that an absence of response from an authority is treated as a denial. The request and response are encrypted using the public/private keys of the participants so only they can read the transactions.

A consensus approach, such as the practical Byzantine fault tolerance is applicable to consensus procedures used to grant access. In the consensus approach, there is a primary replica and some number of additional replicas, which provide both transparency and protection against fraudulent participants. The vendor would typically be the primary replica, with the enforcement agency, judicial authority, and validating peers as additional replicas. The additional validating peers provide transparency to the process, which helps keep each participant within their agreed-to boundaries. It also enables the publication of anonymous statistical reports, without any private details, of how many requests and approvals take place in the process, which would be of interest to journalists, financial auditors, and other policy agencies not directly involved in the access request. There may also be a requirement for an identity manager to manage the roles of the different participants, and secure their connectivity and public key information.

In one example method of operation for protecting data within a user mobile device may include performing an initial registration procedure involving the mobile device by requesting creation of an account. This request may be in the form of a blockchain transaction broadcast to a plurality of replica nodes and/or validating peer device. In response to approval of the request, the transaction may be added with other transactions as a block in the blockchain, indicating approval for generation of the encryption key. The mobile device generates the encryption key in response to the approval and encrypts data using the encryption key.

Figure 2:
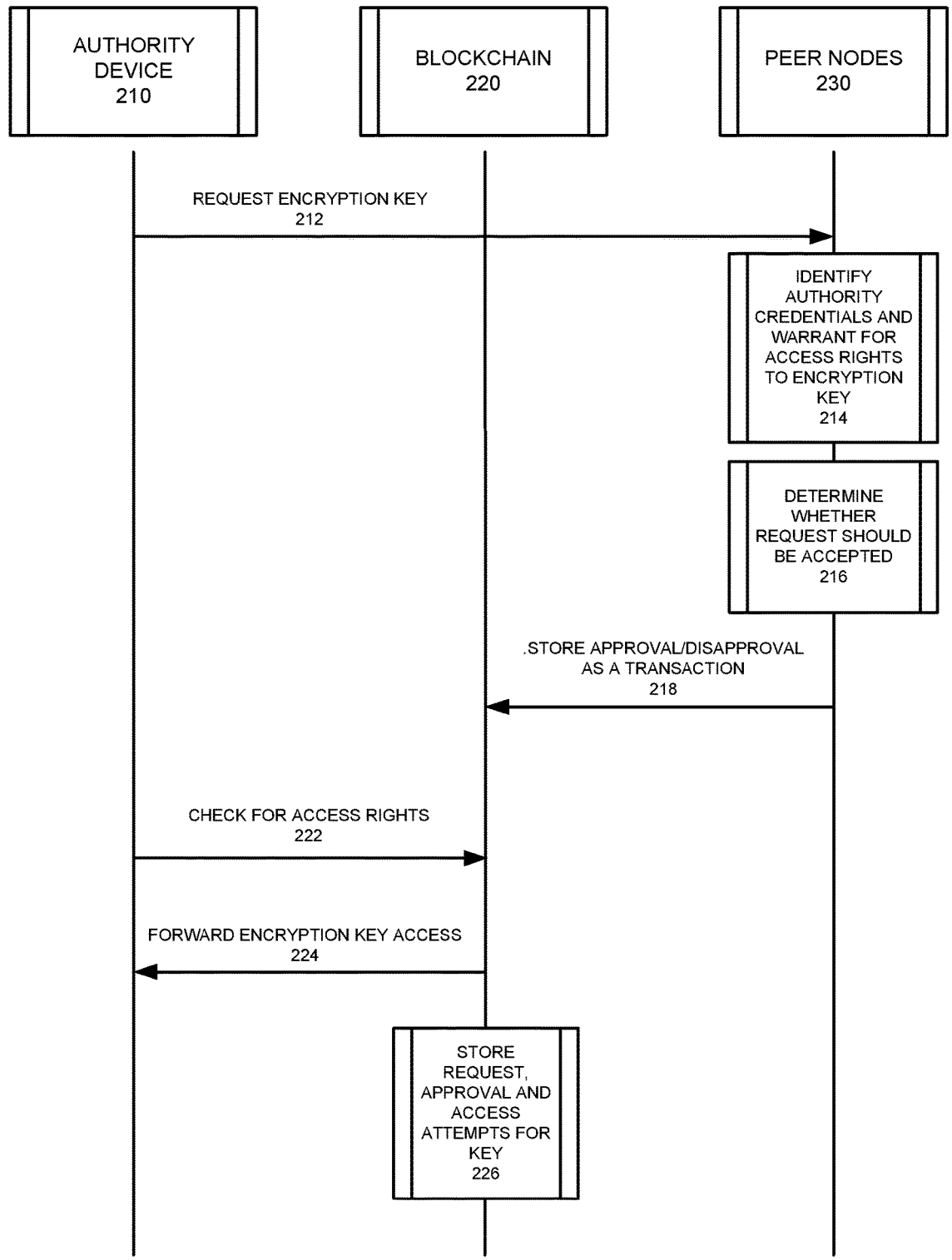
FIG. 2 illustrates a system signaling diagram of the interactions between a blockchain, an authority device and peer nodes according to example embodiments.

FIG. 2 illustrates a system signaling diagram of the interactions between a blockchain, an authority device and peer nodes according to example embodiments. Referring to FIG. 2, the system diagram 200 includes an authority device 210, a blockchain 220 and one or more peer nodes 230. In this example, the authority device 210 may request access to an encryption key of a mobile device 212. The peer nodes may collectively decide whether the device should be authorized based on its credentials and the necessary permissions 214 (i.e. warrant, etc.) and will reach a consensus regarding whether to grant the request 216. The decision will be formed into a transaction and forwarded 218 to the blockchain for logging. The right to use access a private user device encryption key is added to the ledger as part of a transaction. When the user device reboots or refreshes a periodic check for access rights 222 may be performed and the encryption key will be forwarded 224 to an intermediate party, such as the vendor or another registered entity, which will provide access to the authority device 210. Any request, approval/denial access attempts to obtain the key from the user device, etc., are all logged as part of the ledger 226.

In one example method of operation, a data access procedure involving the mobile device may include a request for access to the mobile device being initiated as a transaction sent to a first authority, which grants or denies the request as an additional transaction. The transaction is then broadcasted to the peer/replica nodes for adding to other transactions as a block in the blockchain. This ensures the recording of the approval/denial of the request for access. The mobile device is configured to check the blockchain periodically and/or during a boot process, and in response to detecting approval for the data request, send the encryption key to another system as necessary. The consensus approach performed by the nodes may be a Practical Byzantine Fault Tolerance consensus approach.

According to one example implementation of the blockchain configuration according to example embodiments, a privileged "enforcement agency" would initiate a request, for example, an entity may submit a request for a "warrant" to the blockchain, which would be reviewed by the legal authority (i.e., a judge) who grants or denies the request. The consensus members/committee reviews the request to validate its authenticity, and then attaches the request to the blockchain similar to the actions of miners in a crypto currency. This essentially is a similar process to obtaining an ordinary warrant from a judge, just handled through a blockchain computerized access procedure. The blockchain records the status of the warrant for that requesting device, so the blockchain is logging/storing a device identifier, approval/denial status, and the requestor information. This information may not be encrypted and may be left as public record.

Once the warrant process is completed, the warrant is granted and recorded, then the device itself periodically checks the blockchain to determine if a warrant is outstanding. Since the vast majority of devices would never have a warrant outstanding, this check should be very fast and only performed during a phone reboot, or network connection, or possibly even as a push request from the device provider. In rare cases where a device does have an outstanding warrant, then it can either send the file storage encryption key to the requester's pre-determined location. This could be the device provider, such as a hosted API, or an enforcement agency directly, such as an entity API, as in the current example. In either case, the implementation protects the authentication of the target location, so that the storage encryption key is accessible. This portion requires a change to the device operating system to perform this check, but it can be part of the standard software and does not require a special "back door" security hole.

The encryption key may be sent to another system, such as the enforcement agency, so access may be obtained. The device provider may provide such a service so that it can be used to decrypt data on an entity storage at the vendor. An entity can use a physical warrant to obtain the physical device, then use a procedure to decrypt the data on the device itself. The key is stored on the device itself and is passed to the requesting location when a warrant has been granted. The device may create and store its own key. The enforcement entity will have its own encrypted identifier, much the same way parties leverage a crypto currency today.

The consensus process approves the ledger transaction the same way a shared ledger would approve financial transactions A first process may be the simple registration of the device to the ledger, which is only performed once when a device is first attached to the network. Secondly an approval process may be used to obtain an electronic warrant, stored in the blockchain when the agency needs the device. Also, is the periodic check from the device to see if a warrant has been issued this might occur once every month or if the device provider or network provider forces a check remotely. Since both the device and network providers are motivated to assist law enforcement, and also motivated not to store the keys themselves.

Figure 3A:
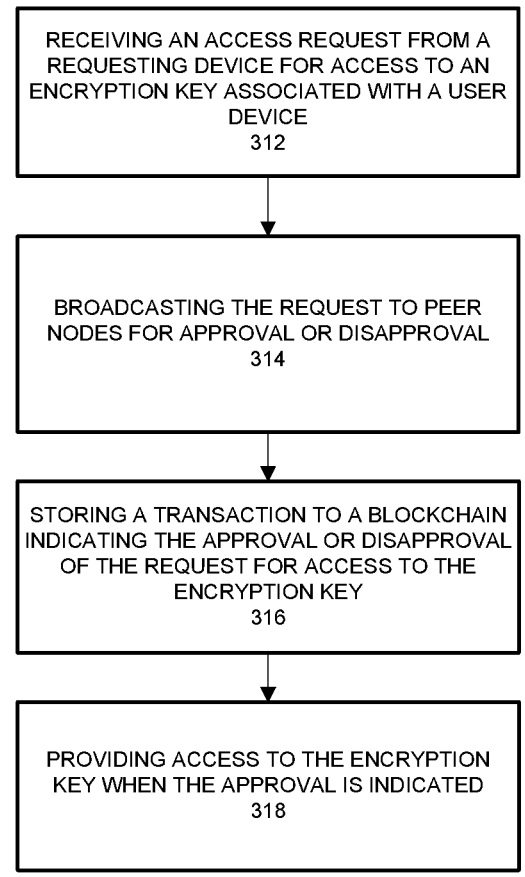
FIG. 3A illustrates a flow diagram of an example method of accessing an encryption key of a user device according to example embodiments.

FIG. 3A illustrates a flow diagram 300 of an example method of creating a change proposal for a network in the blockchain according to example embodiments. Referring to FIG. 3A, the method may include receiving an access request from a requesting device for access to an encryption key associated with a user device 312, broadcasting the request to peer nodes for approval or disapproval 314, storing a transaction to a blockchain indicating the approval or disapproval of the request for access to the encryption key 316, and providing access to the encryption key when the approval is indicated 318. The access request includes one or more of credentials of the requesting device and a legal warrant for access to the encryption key. The method may also include receiving a registration request for registration from the user device, broadcasting the request to the peer nodes, and transmitting an approval transaction approving the registration request to the blockchain. The approval transaction includes a device identifier of the user device. The method may further include accessing the blockchain via the user device during a boot process to identify approval of the access request in the transaction, and responsive to identifying approval of the access request, transmitting the encryption key via an application programming interface (API) to one or more of a vendor device associated with the user device and the requesting device. Approval is performed via the plurality of peer nodes via a practical Byzantine fault tolerance consensus. The approval transaction further includes one or more of a biometric identifier associated with a user of the user device and a user profile of the user of the user device.

Figure 3B:
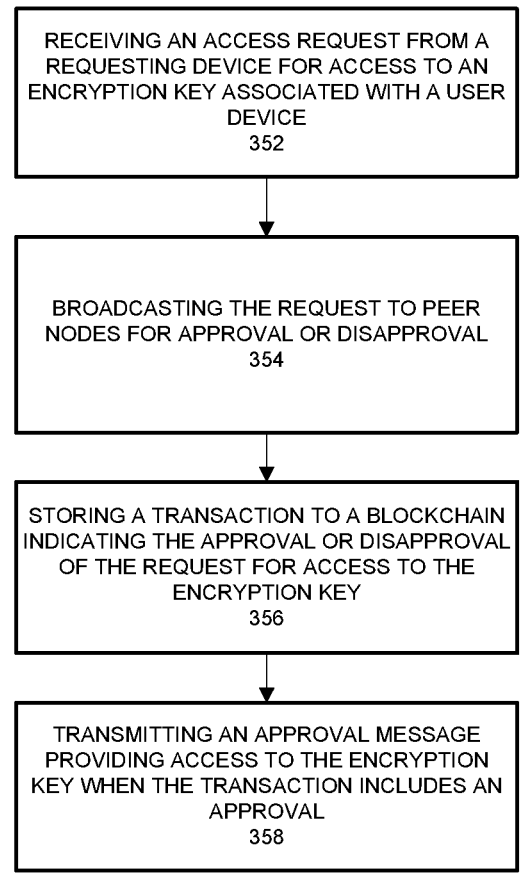
FIG. 3B illustrates a flow diagram of another example method of accessing an encryption key of a user device according to example embodiments.

FIG. 3B illustrates a flow diagram 350 of an example method of creating a change proposal for a network in the blockchain according to example embodiments. Referring to FIG. 3B, the method may include receiving an access request from a requesting device for access to an encryption key associated with a user device 352, broadcasting the request to peer nodes for approval or disapproval 354, storing a transaction to a blockchain indicating the approval or disapproval of the request for access to the encryption key 356, and transmitting an approval message providing access to the encryption key when the transaction comprises an approval 358. The access request includes credentials of the requesting device and a legal warrant for access to the encryption key. The method may also include receiving a registration request for registration from the user device, broadcasting the request to the peer nodes, and transmitting an approval transaction approving the registration request to the blockchain. The approval transaction includes a device identifier of the user device. The method may further include accessing the blockchain via the user device during a boot process to identify approval of the access request in the transaction, and responsive to identifying approval of the access request, transmitting the encryption key via an application programming interface (API) to one or more of a vendor device associated with the user device and the requesting device. Approval is performed via the plurality of peer nodes via a practical Byzantine fault tolerance consensus. The approval transaction further includes one or more of a biometric identifier associated with a user of the user device and a user profile of the user of the user device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
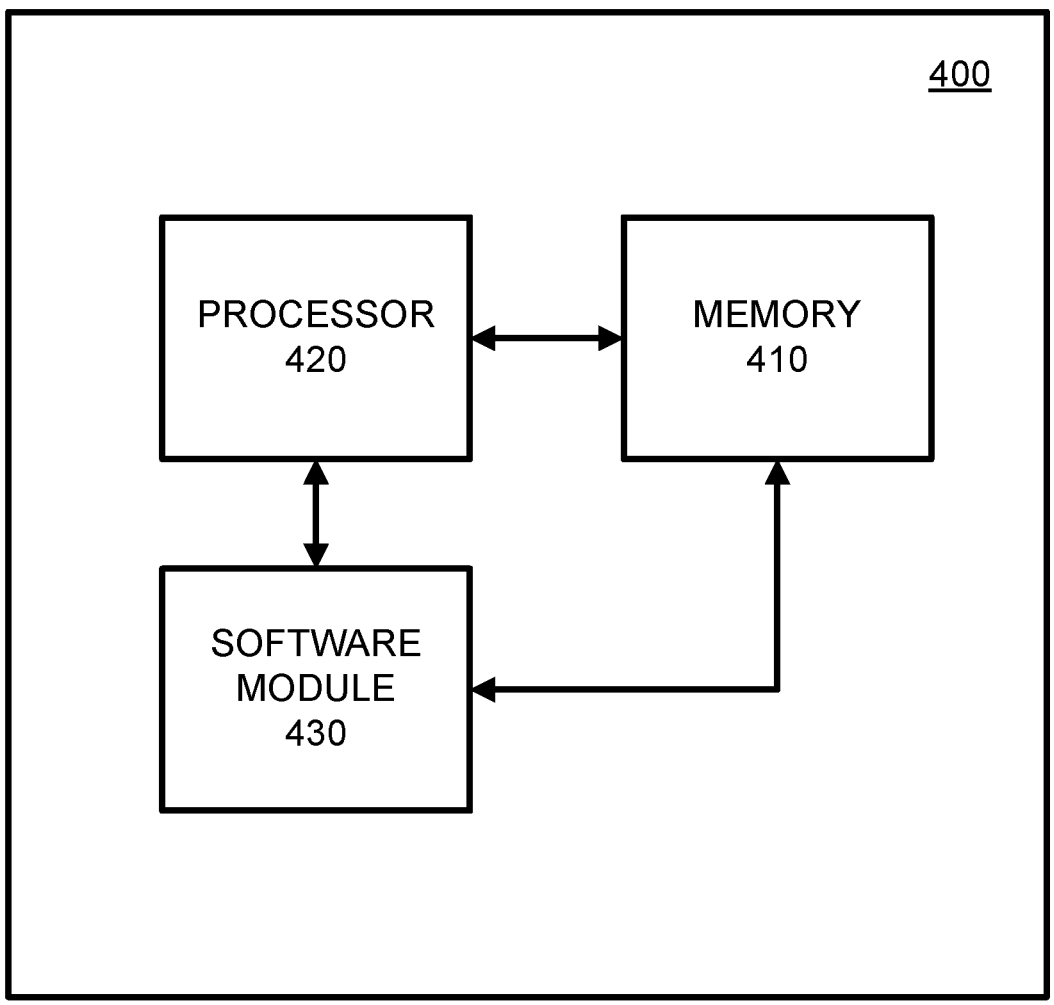
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method for policy enforcement, comprising:
    receiving an access request from a requesting device for access to an encryption key associated with a user device, wherein access to the encryption key requires a legal warrant;
    receiving a request for the legal warrant from the requesting device to access the user device, the request for the legal warrant having an expiration period;
    broadcasting the request for access to the encryption key and the request for the legal warrant to peer nodes for approval or disapproval;
    when the request for access to the encryption key is approved and the legal warrant is authorized before the expiration period expires:
        storing a transaction to a blockchain indicating the approval of the request for access to the encryption key, and
        providing access to the encryption key; and
    when the request for access to the encryption key is disapproved or the legal warrant is not authorized before the expiration period expires:
        storing a transaction to a blockchain indicating the disapproval of the request for access to the encryption key, and
        denying access to the encryption key.

2. The method of claim 1, wherein the access request comprises one or more of credentials of the requesting device.

3. The method of claim 1, further comprising:
    receiving a registration request for registration from the user device;
    broadcasting the registration request to the peer nodes; and
    transmitting an approval transaction approving the registration request to the blockchain.

4. The method of claim 3, wherein the approval transaction comprises a device identifier of the user device.

5. The method of claim 1, further comprising:
    accessing the blockchain via the user device during a boot process to identify approval of the access request in the transaction; and
    responsive to identifying approval of the access request, transmitting the encryption key via an application programming interface (API) to one or more of a vendor device associated with the user device and the requesting device.

6. The method of claim 1, wherein approval is performed via the plurality of peer nodes via a practical Byzantine fault tolerance consensus.

7. The method of claim 3, wherein the approval transaction further comprises one or more of a biometric identifier associated with a user of the user device and a user profile of the user of the user device.

8. An apparatus configured to perform policy enforcement, comprising:
    a receiver configured to:

receive an access request from a requesting device for access to an encryption key associated with a user device, wherein access to the encryption key requires a legal warrant, and receive a request for the legal warrant from the requesting device to access the user device, the request for the legal warrant having an expiration period; and a processor configured to:

broadcast the request for access to the encryption key and the request for the legal warrant to peer nodes for approval or disapproval, when the request for access to the encryption key is approved and the legal warrant is authorized before the expiration period expires, store a transaction to a blockchain indicating the approval of the request for access to the encryption key, and when the request for access to the encryption key is disapproved or the legal warrant is not authorized before the expiration period expires, store a transaction to a blockchain indicating the disapproval of the request for access to the encryption key; and a transmitter configured to provide access to the encryption key when the approval is indicated in the stored transaction.

9. The apparatus of claim 8, wherein the access request comprises one or more of credentials of the requesting device.

10. The apparatus of claim 8, wherein the receiver is further configured to receive a registration request for registration from the user device, the processor is further configured to broadcast the registration request to the peer nodes, and the transmitter is further configured to transmit an approval transaction approving the registration request to the blockchain.

11. The apparatus of claim 10, wherein the approval transaction comprises a device identifier of the user device.

12. The apparatus of claim 8, wherein the processor is further configured to access the blockchain via the user device during a boot process to identify approval of the access request in the transaction, and responsive to identifying approval of the access request, the transmitter is further configured to transmit the encryption key via an application programming interface (API) to one or more of a vendor device associated with the user device and the requesting device.

13. The apparatus of claim 8, wherein approval is performed via the plurality of peer nodes via a practical Byzantine fault tolerance consensus.

14. The apparatus of claim 10, wherein the approval transaction further comprises one or more of a biometric identifier associated with a user of the user device and a user profile of the user of the user device.

15. A non-transitory computer readable storage medium configured to store policy enforcement instructions that, when executed, cause a processor to perform:

receiving a request from a requesting device for access to an encryption key associated with a user device, wherein access to the encryption key requires a legal warrant;

receiving a request for the legal warrant from the requesting device to access the user device, the request for the legal warrant having an expiration period;

broadcasting the request for access to the encryption key and the request for the legal warrant to peer nodes for approval or disapproval;

when the request for access to the encryption key is approved and the legal warrant is authorized before the expiration period expires:

storing a transaction to a blockchain indicating the approval of the request for access to the encryption key, and providing access to the encryption key; and when the request for access to the encryption key is disapproved or the legal warrant is not authorized before the expiration period expires:

storing a transaction to a blockchain indicating the disapproval of the request for access to the encryption key, and denying access to the encryption key.

16. The non-transitory computer readable storage medium of claim 15, wherein the access request comprises one or more of credentials of the requesting device.

17. The non-transitory computer readable storage medium of claim 15, wherein the policy enforcement instructions are further configured to cause the processor to perform:

receiving a registration request for registration from the user device;

broadcasting the registration request to the peer nodes; and transmitting an approval transaction approving the registration request to the blockchain.

18. The non-transitory computer readable storage medium of claim 17, wherein the approval transaction comprises a device identifier of the user device.

19. The non-transitory computer readable storage medium of claim 15, wherein the policy enforcement instructions are further configured to cause the processor to perform:

accessing the blockchain via the user device during a boot process to identify approval of the access request in the transaction; and responsive to identifying approval of the access request, transmitting the encryption key via an application programming interface (API) to one or more of a vendor device associated with the user device and the requesting device.

20. The non-transitory computer readable storage medium of claim 17, wherein approval is performed via the plurality of peer nodes via a practical Byzantine fault tolerance consensus, and wherein the approval transaction further comprises one or more of a biometric identifier associated with a user of the user device and a user profile of the user of the user device.

* * * * *